United States Patent
Cao et al.

(10) Patent No.: US 9,154,342 B2
(45) Date of Patent: Oct. 6, 2015

(54) APPARATUS AND METHOD FOR CANCELLING IN-BAND INTERFERENCES

(75) Inventors: Aijun Cao, S-Stockholm (SE); Thorsten Schier, S-Stockholm (SE); Yonghong Gao, S-Stockholm (SE)

(73) Assignee: ZTE Wistron Telecom AB (CN)

( * ) Notice: Subject to any disclaimer, the term of this patent is extended or adjusted under 35 U.S.C. 154(b) by 0 days.

(21) Appl. No.: 14/351,757

(22) PCT Filed: May 9, 2012

(86) PCT No.: PCT/CN2012/075265
§ 371 (c)(1),
(2), (4) Date: Jul. 14, 2014

(87) PCT Pub. No.: WO2013/053227
PCT Pub. Date: Apr. 18, 2013

(65) Prior Publication Data
US 2014/0328438 A1    Nov. 6, 2014

(30) Foreign Application Priority Data

Oct. 12, 2011    (WO) ................ PCT/CN2011/080694

(51) Int. Cl.
*H04L 25/03*    (2006.01)
*H04B 1/71*    (2011.01)
*H04B 7/04*    (2006.01)

(52) U.S. Cl.
CPC ............ *H04L 25/03821* (2013.01); *H04B 1/71* (2013.01); *H04L 25/03891* (2013.01); *H04B 7/0413* (2013.01); *H04L 2025/03426* (2013.01)

(58) Field of Classification Search
CPC .. H04B 1/71; H04B 7/0413; H04L 25/03178; H04L 25/03286; H04L 25/03821; H04L 2025/03426; H04L 1/005
See application file for complete search history.

(56) References Cited

U.S. PATENT DOCUMENTS 8,687,751 B1 *   4/2014   Lee et al. ...................... 375/347
8,694,851 B1 *   4/2014   Sun et al. ...................... 714/758
(Continued)

FOREIGN PATENT DOCUMENTS

| CN | 101394210 | 3/2009 |
| CN | 101458931 | 6/2009 |
| CN | 101958770 | 1/2011 |
| WO | 0021204   | 4/2000 |

OTHER PUBLICATIONS

Ee-Lin Kuan, Burst-by-Burst Adaptive Multiuser Detection CDMA: A Framework for Existing and Future Wireless Standards, Proceedings of the Leee, vol. 91, No. 2, Feb. 2003.

(Continued)

*Primary Examiner* — Aristocratis Fotakis
(74) *Attorney, Agent, or Firm* — Plumsea Law Group, LLC

(57) ABSTRACT

The present document discloses an apparatus and method for cancelling in-band interference in a cellular telecommunication system which using multiple-input multiple-output technique. The method includes: receiving a transmitted signal and obtaining an interfering data stream; calculating a value of a credit; deciding whether the credit is above a predefined threshold; regenerating an interference signal by using the interfering data stream if the credit is above the predefined threshold; subtracting the regenerated interference signal from the received transmitted signal to obtain a target signal; and demodulating and decoding the target signal. By using the apparatus and method, the concerned signal can be regenerated even when there is only small number of error bits while all the other bits are correctly decoded. Also, the target stream would be able to know whether the interfering stream can be regenerated or not, before the decoding.

16 Claims, 4 Drawing Sheets

(56) References Cited

U.S. PATENT DOCUMENTS

2007/0280368 A1 12/2007 Jonsson
2010/0183101 A1 7/2010 Mundarath et al.
2012/0189083 A1* 7/2012 Reial .............................. 375/340
2014/0376650 A1* 12/2014 Vojcic et al. .................. 375/260

OTHER PUBLICATIONS

European Search Report mailed Feb. 19, 2015 in European Application 12 839 908.6.

* cited by examiner

Prior Art

Prior Art

APPARATUS AND METHOD FOR CANCELLING IN-BAND INTERFERENCES

TECHNICAL FIELD

This document is related to the base-stations and user equipments receiving multiple data streams in the same bandwidth in cellular telecommunication systems, especially to the apparatus and method for cancelling in-band interferences.

BACKGROUND

As the demands for higher and higher data rates from a mobile user in a cellular communication system increase, on one hand, a higher peak data rate is expected for an individual user at a time, and on the other hand, those advanced techniques to increase the spectrum efficiency are of more interests. Due to the limitation of available radio spectrum, high data rates would be shared by as many mobile users as possible.

One of the most promising techniques is MIMO, which enables not only multiple data streams in the same bandwidth for an individual user, as illustrated in FIG. 1, but also multiple data streams from different users in the same bandwidth, as shown in FIG. 2. Even further, two users with different air interfaces could transmit radio signals in the same bandwidth.

In the above mentioned cases, the crossing data streams from the same user or different users interfere with each other, thus in-band interferences exist from prospective of each data stream. That is, when demodulating and decoding stream 1, there is signal component from stream 2, and vice versa. This signal component is actually interference besides the background noise. Therefore, at the receiver side some special advanced techniques must be involved to relieve or cancel the cross interferences among data. Sequential interference cancellation (SIC) is one of the techniques for relieving or cancelling the cross interferences, as shown in FIG. 3.

The idea of an SIC receiver is to take the advantage of the case where one data can be decoded correctly in terms of CRC checksum. Of all the crossing data streams, if one CRC is observed, then the data stream is re-encoded and re-modulated, then re-generated together with the channel estimates. The regenerated signal is then subtracted from the total received signal resulting in a residue signal. Finally a second attempt to demodulate and decode is performed on the residue signal for the rest of the crossing data streams whose CRC checksum is not OK.

FIG. 4 shows another example of a so-called turbo-SIC receiver. The turbo-SIC receiver even takes more advantage of the CRC-OK data stream by taking out the Log Likelihood Ratio (LLR) values after decoding and performing soft modulation to reconstruct the signal constellation estimates then regenerating the signal as previous example. LLR values after decoding are regarded to be more reliable thus good for the signal regeneration. Some substantiate performance gain is expected from Turbo-SIC at the cost of complexity.

Both SIC and Turbo-SIC receivers use the CRC checksum as the only criteria for the decision whether the concerned signal should be regenerated or not. Nature CRC checksum has zero tolerance to a single error bit, which means that the interference signal is able to be regenerated only when all of the decoded bits are correct, therefore with this post-decoding regeneration, the criteria is actually too high thus removes the possibility where most of the decoded bits are correct. The key point is to find an alternative criteria, which is not so strict as the CRC checksum.

SUMMARY

In this document, a new criteria for regenerating the interference signals is proposed instead of the conventional CRC checksum. In the new criteria, a credit is calculated purely based on the soft bits input to the decoder and the credit is actually the signal-to-noise-ratio of the soft bits. Hereby the soft bits can be obtained either after demodulation, or after HARQ (Hybrid ARQ) combining. And if the credit is greater than a predefined threshold, then the interference signal is regenerated and subtracted from the total received signal and a second attempt to demodulate and decode is performed over the residue signal.

This new criteria actually enables pre-decoding regeneration, which means that the interference signal can even be regenerated based on the soft bits before being decoded if the process time is not allowed. The predefined threshold can be a little bit higher than that in the case of post-decoding regeneration. The predefined threshold is configurable by software according to different application scenarios as in the prior art, which could be −10 dB~20 dB.

An object of the present document is to provide an apparatus for cancelling in-band interference in a cellular telecommunication system which using multiple-input multiple-output technique, comprising: a receiver for receiving a transmitted signal and obtaining an interfering data stream; a credit assessment block for calculating a value of a credit; a judgment block for deciding whether the credit is above a predefined threshold; a regeneration block for regenerating an interference signal by using the interfering data stream; a subtractor for subtracting the regenerated interference signal from the received transmitted signal to obtain a target signal; and a demodulating and decoding block for demodulating and decoding the target signal.

In accordance with a certain embodiment of the invention, the credit assessment block is configured to calculate the value of the credit by using soft bits of the interfering data stream.

In accordance with a further embodiment of the invention, the soft bits is obtained after demodulation of the interfering data stream or Hybrid Automatic Repeat reQuest combining of the interfering data stream.

In accordance with a still further embodiment of the invention, the credit assessment block comprises: an extractor for extracting amplitudes of the soft bits, $x_i$; a first calculator for calculating an average of the soft bits $x_i$, $A_1$; a second calculator for calculating an average of square of the soft bits $x_i$, $A_2$; a third calculator for calculating an average of power of three of the soft bits $x_i$, $A_3$; a forth calculator for calculating a decision variable $$Z = \frac{A_3 - A_1 \cdot A_2}{A_3 - A_1 \cdot A_2 + A_1^3};$$

a fifth calculator for calculating ρ value as the credit by using the calculated decision variable Z and an equation:

$$Z(\rho) = \frac{2\rho + \sqrt{\frac{2}{\pi}} e^{-\frac{\rho^2}{2}} \left(2e^{-\sqrt{\frac{\pi}{2}} \cdot \rho} - 1\right)}{2\rho + \sqrt{\frac{2}{\pi}} e^{-\frac{\rho^2}{2}} \left(2e^{-\sqrt{\frac{\pi}{2}} \cdot \rho} - 1\right) + \left[\rho + \sqrt{\frac{2}{\pi}} e^{-\sqrt{\frac{\pi}{2}} \cdot \rho} e^{-\frac{\rho^2}{2}}\right]^3}.$$

In accordance with a still further embodiment of the invention, the credit assessment block comprises: a calculator for calculating a signal-to-noise-ratio of the soft bits as the credit.

In accordance with a still further embodiment of the invention, the predefined threshold is between −10 dB~20 dB.

In accordance with a still further embodiment of the invention, the regeneration block is configured to regenerate the interference signal by using the soft bits before the interfering data stream is decoded.

In accordance with a still further embodiment of the invention, the regeneration block further comprises: a modulator for modulating the soft bits.

In accordance with a still further embodiment of the invention, the regeneration block is configured to regenerate the interference signal after the interfering data stream is decoded.

In accordance with a still further embodiment of the invention, the regeneration block is further configured to regenerate the interference signal by using Log Likelihood Ratio values.

Another object of the present document is to provide a method for cancelling in-band interference in a cellular telecommunication system which using multiple-input multiple-output technique, comprising: receiving a transmitted signal and obtaining an interfering data stream; calculating a value of a credit; deciding whether the credit is above a predefined threshold; regenerating an interference signal by using the interfering data stream if the credit is above the predefined threshold; subtracting the regenerated interference signal from the received transmitted signal to obtain a target signal; and demodulating and decoding the target signal.

In accordance with a certain embodiment of the invention, the step of calculating a value of a credit comprises: calculating the value of the credit by using soft bits of the interfering data stream.

In accordance with a further embodiment of the invention, the soft bits is obtained after demodulation of the interfering data stream or Hybrid Automatic Repeat reQuest combining of the interfering data stream.

In accordance with a still further embodiment of the invention, the step of calculating a value of a credit further comprises: extracting amplitudes of the soft bits, $x_i$; calculating an average of the soft bits $x_i$, $A_1$; calculating an average of square of the soft bits $x_i$, $A_2$; calculating an average of power of three of the soft bits $x_i$, $A_3$; calculating a decision variable $$Z = \frac{A_3 - A_1 \cdot A_2}{A_3 - A_1 \cdot A_2 + A_1^3};$$

calculating ρ value as the credit by using the calculated decision variable Z and an equation:

$$Z(\rho) = \frac{2\rho + \sqrt{\frac{2}{\pi}} e^{-\frac{\rho^2}{2}} \left(2e^{-\sqrt{\frac{\pi}{2}} \cdot \rho} - 1\right)}{2\rho + \sqrt{\frac{2}{\pi}} e^{-\frac{\rho^2}{2}} \left(2e^{-\sqrt{\frac{\pi}{2}} \cdot \rho} - 1\right) + \left[\rho + \sqrt{\frac{2}{\pi}} e^{-\sqrt{\frac{\pi}{2}} \cdot \rho} e^{-\frac{\rho^2}{2}}\right]^3}.$$

In accordance with a still further embodiment of the invention, the step of calculating a value of a credit further comprises: calculating a signal-to-noise-ratio of the soft bits as the credit.

In accordance with a still further embodiment of the invention, the predefined threshold is between −10 dB~20 dB.

In accordance with a still further embodiment of the invention, the step of regenerating an interference signal by using the interfering data stream comprises: regenerating the interference signal by using the soft bits before the interfering data stream is decoded.

In accordance with a still further embodiment of the invention, the step of regenerating an interference signal by using the interfering data stream further comprises: modulating the soft bits.

In accordance with a still further embodiment of the invention, the step of regenerating an interference signal by using the interfering data stream comprises: regenerating the interference signal after the interfering data stream is decoded.

In accordance with a still further embodiment of the invention, the step of regenerating an interference signal by using the interfering data stream further comprises: regenerating the interference signal by using Log Likelihood Ratio values.

The apparatuses and methods of the present patent document do not rely on the correct CRC checksum to decide whether the concerned signal should be regenerated or not. Thus the concerned signal can be regenerated even when there is only small number of error bits while all the other bits are correctly decoded. Furthermore, in the apparatuses and methods of the present patent document patent document, the target stream would be able to know whether the interfering stream can be regenerated or not, before the decoding.

DETAILED DESCRIPTION

In the present patent document, the apparatuses and methods for cancelling the in-band interference are presented. In the apparatuses and methods of the present patent document, the criteria for deciding whether the interference signal should be regenerated or not is whether a credit is above a predefined threshold. And the soft bits are extracted from the interfering data stream. The credit is calculated based on the soft bits input to the decoder, which could be the output of demodulator or HARQ combiner. And the credit is actually the signal-to-noise-ratio of the soft bits.

The following steps indicate how to calculate the credit:

Step 1: extract the amplitudes of all soft bits, termed as $x_i$;
Step 2: calculate the average of $x_i$, $E\{x\}$, termed as $A_1$;
Step 3: calculate the average of square of $x_i$, $E\{x^2\}$, termed as $A_2$;
Step 4: calculate the average of the power of three of $x_i$, $E\{x^3\}$, termed as $A_3$;

Step 5: calculate the decision variable $$\hat{Z} = \frac{A_3 - A_1 \cdot A_2}{A_3 - A_1 \cdot A_2 + A_1^3} = \frac{E\{x^3\} - E\{x\} \cdot E\{x^2\}}{E\{x^3\} - E\{x\} \cdot E\{x^2\} + [E\{x\}]^3};$$

Step 6: look up the table which is based on the following equation, and find the closest $\rho$ value as the credit:

$$Z(\rho) = \frac{E\{x^3\} - E\{x\} \cdot E\{x^2\}}{E\{x^3\} - E\{x\} \cdot E\{x^2\} + [E\{x\}]^3}$$

$$= \frac{2\rho + \sqrt{\frac{2}{\pi}} e^{-\frac{\rho^2}{2}} \left(2e^{-\sqrt{\frac{\pi}{2}} \cdot \rho} - 1\right)}{2\rho + \sqrt{\frac{2}{\pi}} e^{-\frac{\rho^2}{2}} \left(2e^{-\sqrt{\frac{\pi}{2}} \cdot \rho} - 1\right) + \left[\rho + \sqrt{\frac{2}{\pi}} e^{-\sqrt{\frac{\pi}{2}} \cdot \rho} e^{-\frac{\rho^2}{2}}\right]^3}.$$

Figure 5:
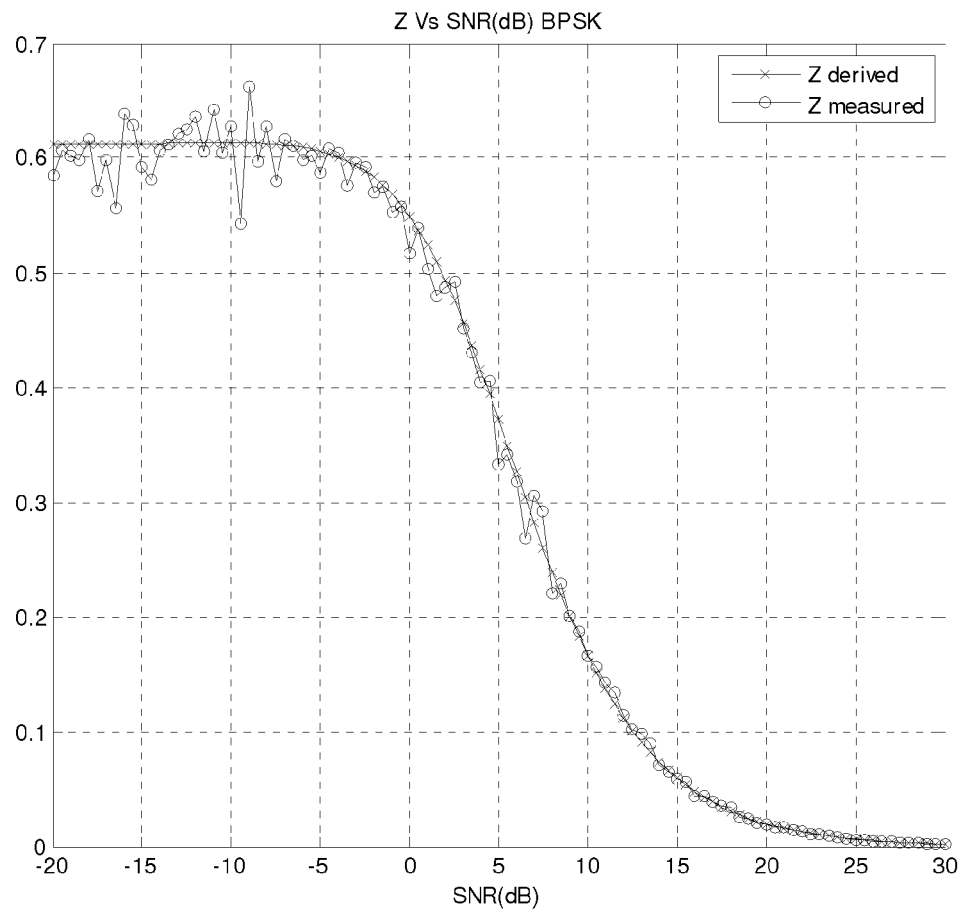
FIG. 5 shows one example of the theoretical values and estimated values of the credit.

FIG. 5 illustrates one example of the theoretical values and estimated values of the credit. It can be seen that the credit is actually the signal-to-noise-ratio of the soft bits.

The apparatus for cancelling in-band interferences of the present patent document will be discussed with reference to FIGS. 6, 7 and 8.

Figure 6:
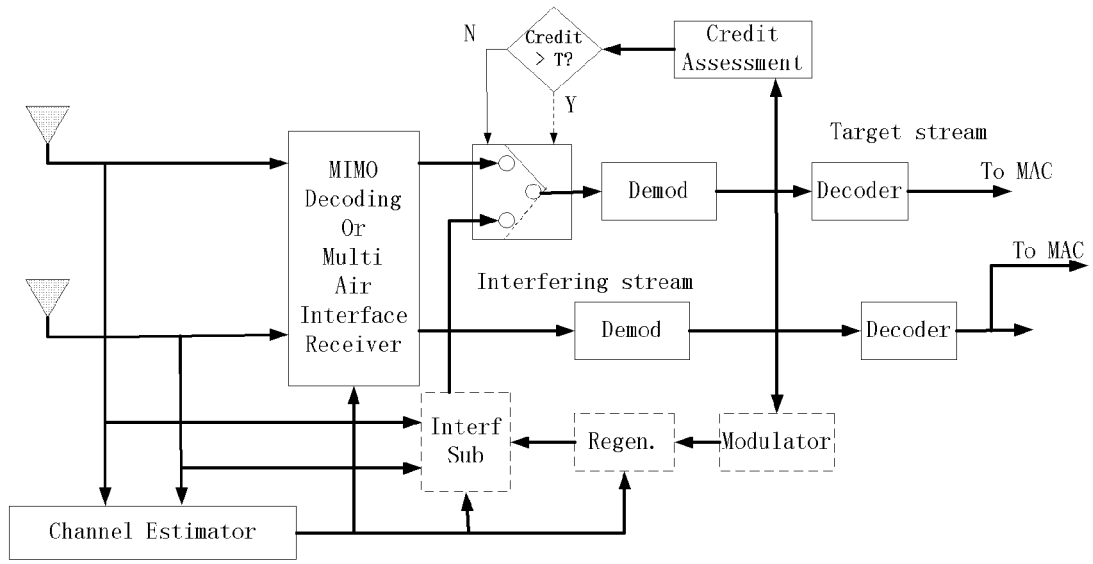
FIG. 6 shows the block diagram of the embodiment for pre-decoding regeneration of the interference signal of the present patent document.

FIG. 6 shows one embodiment of this invention for pre-decoding regeneration. The block diagram of FIG. 6 comprises a MIMO decoding or multi-air interface receiver for receiving the transmitted signal and obtaining an interfering data stream, a credit assessment block for calculating the value of the credit, a judgment block for deciding whether the credit is above a predefined threshold, a regeneration block for regenerating the interference signal, a subtractor for subtracting the regenerated interference signal from the total received signal to obtain the target signal, and a demodulating and decoding block for demodulating and decoding the target signal. Wherein the MIMO decoding or multi-air interface receiver receives the total transmitted signal and do the first attempt to demodulate and decode its own data stream, and in this stage, data streams have cross interference to each other.

In the embodiment of FIG. 6, the regeneration block comprises a modulator for modulating the soft bits and a channel estimator to regenerate the interference signal. Specifically, the soft bits is modulated by the modulator and multiplied by the channel estimates. The regeneration block also comprises a demodulator and a decoder which are also in the prior art.

As stated above, for an interfering data stream, the credit is immediately calculated based on the soft bits after demodulation or HARQ combining, and at the same time, the soft bits can be input to the decoder. If the calculated credit is above the predefined threshold, then the interference signal is regenerated directly by modulating the soft bits and being multiplied by the channel estimates, and then the regenerated interference signal is subtracted from the total received signal to get a residue signal. The target stream can be demodulated and decoded on the residue signal for a second time.

This embodiment can be typically applied to the case where a narrow band signal such as a GSM signal is situated within a wide-band signal such as a UMTS signal. And the narrow band signal acts as the interference signal, and usually its TTI (Transport Time Interval) is too long for post-decoding regeneration. So the predefined threshold can be lifted to a certain level which makes the pre-decoding regeneration reliable. The predefined threshold is configurable by software according to different application scenarios, which could be −10 dB~20 dB.

Figure 7:
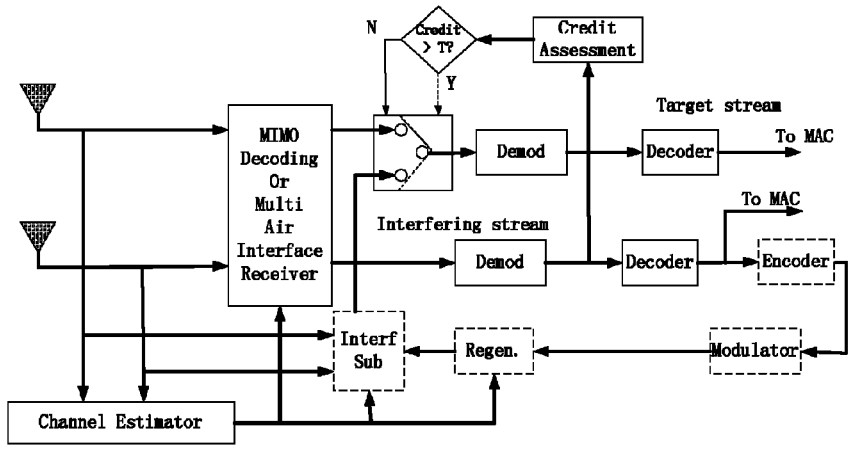
FIG. 7 shows the block diagram of the embodiment for post-decoding hard regeneration of the interference signal of the present patent document.

In FIG. 7, an embodiment of post-decoding hard regeneration is illustrated. The embodiment of FIG. 7 is the same with the embodiment of FIG. 6 except the regeneration of the interference signal. In the embodiment of FIG. 7, the regeneration of the interference signal does not use the soft bits. The regeneration of the interference signal is done after the interference signal is decoded. The regeneration block comprises a demodulator and a decoder which are also in the prior art. The regeneration block also comprises an encoder and a modulator and a channel estimator for regenerating the interference signal, which are the same with the prior art.

In this embodiment, the credit is calculated as stated above. If the credit is greater than the predefined threshold, then the regeneration is done after the interfering data stream is decoded. The hard bits after decoding are extracted at first, then encoded and modulated as at the transmitter side. The modulated symbols are multiplied with the channel estimates to obtain the regenerated signal, which is removed from the total received signal. Finally the target stream can be demodulated and decoded on the residue signal for a second time.

Figure 1:
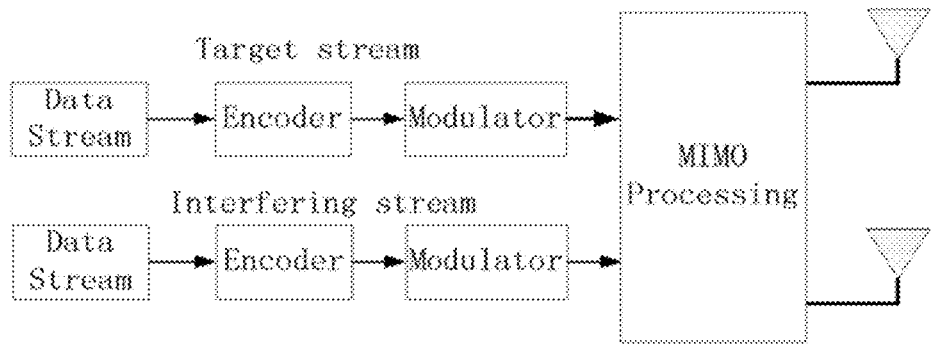
FIG. 1 shows the block diagram for transmitting multiple data streams in the same bandwidth for an individual user.
Figure 2:
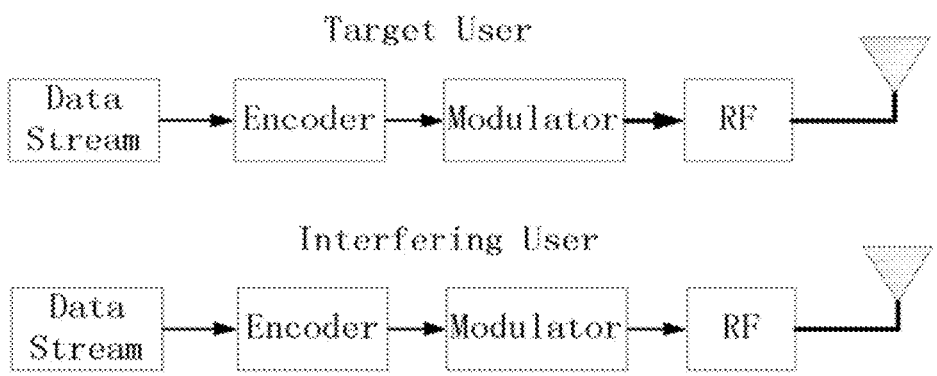
FIG. 2 shows the block diagram for transmitting multiple data streams from different users in the same bandwidth.
Figure 3:
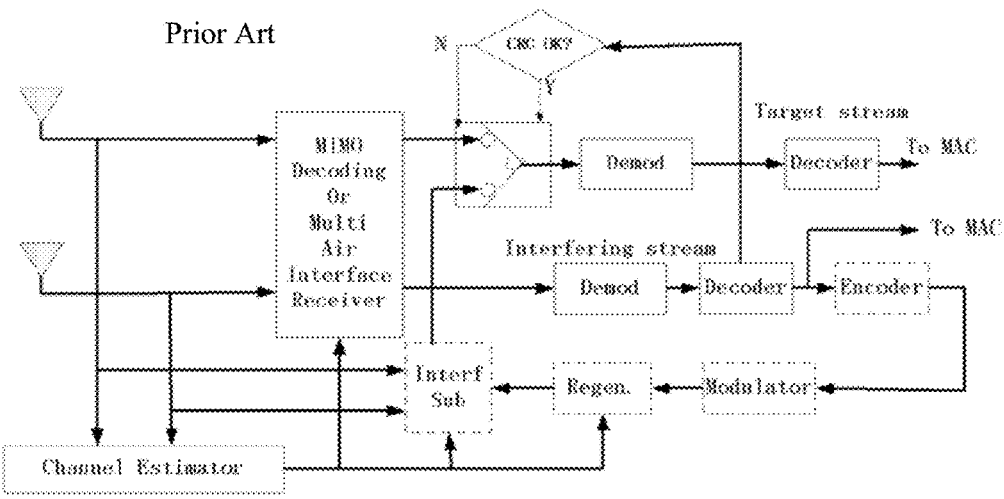
FIG. 3 shows the block diagram of conventional sequential interference cancellation at the receiver side.
Figure 4:
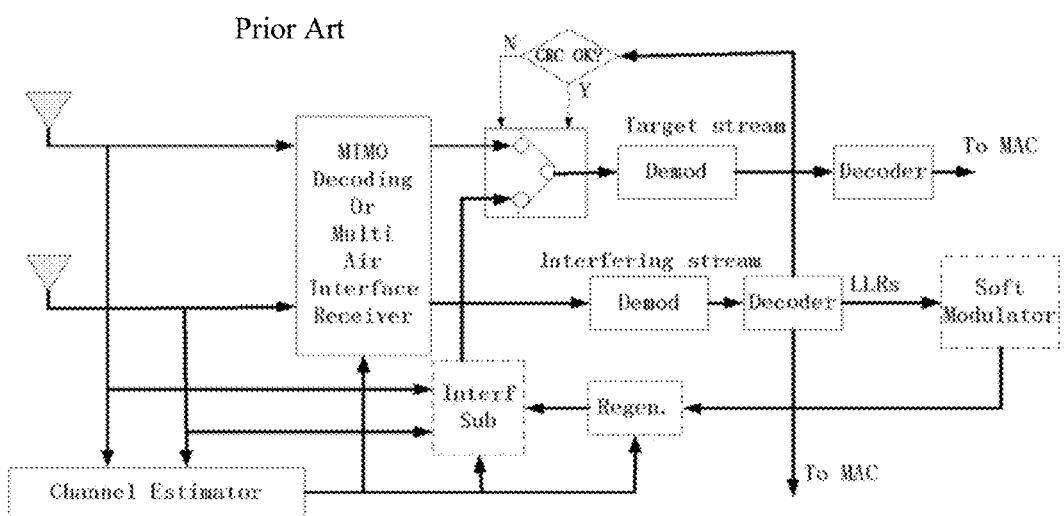
FIG. 4 shows the block diagram of the turbo-SIC receiver.
Figure 8:
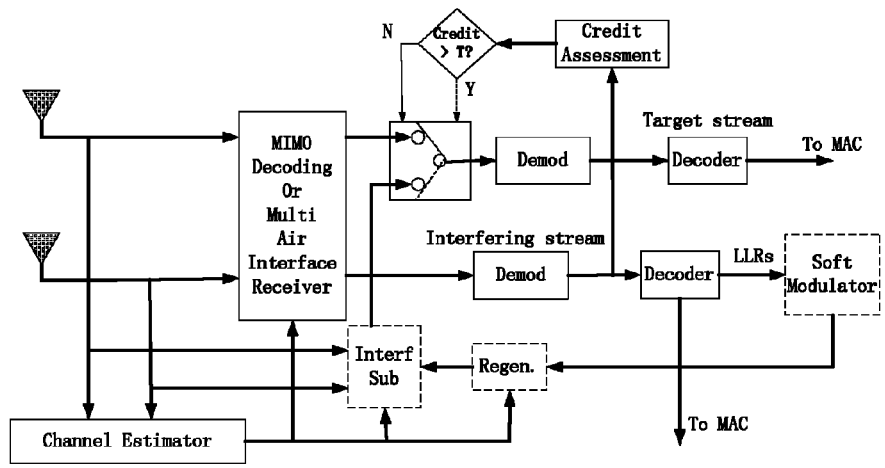
FIG. 8 shows the block diagram of the embodiment for post-decoding soft regeneration of the interference signal of the present patent document.

Another embodiment of post-decoding soft regeneration is shown in FIG. 8. The embodiment of FIG. 8 is the same with the embodiment of FIG. 7 except the regeneration of the interference signal. In embodiment of FIG. 8, the regeneration of the interference signal takes more advantage of the CRC-OK data stream by taking out the Log Likelihood Ratio (LLR) values after decoding and performing soft modulation to reconstruct the signal constellation estimates then regenerating the signal as in FIG. 4. That is, this post-decoding regeneration utilizes further the benefits brought by the decoder, since the LLR values after being decoded are used for signal regeneration, thus termed as "post-decoding soft regeneration". The module "soft modulator" turns LLR values into constellation estimates.

"Turbo-Coded Optical Recording Channels with DVD Minimum Mark Size" by Laura L. McPheters and Steven W. McLaughlin, IEEE Transactions on Magnetics, Vol. 38, No. 1, pp. 298-302, January, and "Iterative turbo decoder analysis based on density evolution" by D. Divsalar, S. Dolinar, and F. Pollara, IEEE J. Select. Areas Commun., vol. 19, no. 5, pp. 891-907, May 2001, have shown how to perform a soft modulation with respective to different modulation schemes.

As stated above, the credit is calculated on the soft bits of the interfering data stream, and if it is larger than the pre-defined threshold, the signal regeneration and cancellation is initiated and another demodulation and decoding over the residue signal is tried for the target streams.

From the embodiments illustrated in FIGS. 6, 7 and 8, it can be seen that the credit is used to decide whether the interference signal should be regenerated or not. And the credit is calculated based on the soft bits extracted from the interfering data stream. The difference between the embodiment of FIG. 6 and the embodiments of FIGS. 7 and 8 is the regeneration of the interference signal. In embodiment of FIG. 6, the interference signal is regenerated by using the soft bits before the interfering data stream is decoded. While in embodiments of FIGS. 7 and 8, the interference signal is regenerated after the interfering data stream is decoded.

Similarly, the methods for cancelling in-band interferences of the present patent document are also presented.

In one embodiment of the present invention, the method comprises: receiving a transmitted signal and obtaining an interfering data stream; calculating a value of a credit; deciding whether the credit is above a predefined threshold; regenerating an interference signal by using the interfering data stream if the credit is above the predefined threshold; subtracting the regenerated interference signal from the received transmitted signal to obtain a target signal; and demodulating and decoding the target signal.

Preferably, the credit can be calculated by using soft bits of the interfering data stream. And the soft bits are obtained after demodulation of the interfering data stream or Hybrid Automatic Repeat reQuest combining of the interfering data stream. The detailed calculation steps have been stated above. Also, the credit is actually the signal-to-noise-ratio of the soft bits.

Preferably, the predefined threshold can be between −10 dB~20 dB.

In one exemplary embodiment, the interference signal is regenerated by using the soft bits before the interfering data stream is decoded. Preferably, the soft bits are modulated to regenerate the interference signal.

In another exemplary embodiment, the interference signal is regenerated after the interfering data stream is decoded. Preferably, the interference signal is regenerated by using Log Likelihood Ratio values.

INDUSTRIAL APPLICABILITY

There are two main advantages for the method of the present patent document.

One is the higher performance gain over the conventional methods because the conventional methods rely on the correct CRC checksum of the interfering stream, thus excluding the benefits when there is only small number of error bits while all the other bits are correctly decoded.

The second advantage is the time advance gained from the non-CRC based criteria. In CRC based criteria, the target stream must wait until the decoding of the interfering stream is finished. This waiting time could be fatal for many traffics which requires as less processing delay as possible, thus might be not possible to obtain any gain from the correctly decoded interfering stream. In the method of the present patent document, the target stream would be able to know whether the interfering stream can be regenerated or not, before the decoding.

While embodiment of the invention have been illustrated and described, it is not intended that these embodiments illustrate and describe all possible forms of the patent document. Rather, the words used in the specification are words of description rather than limitation, and it is understood that various changes and modifications may be made without departing from the spirit and scope of the patent document.

What is claimed is:

1. An apparatus for cancelling in-band interference in a cellular telecommunication system which using multiple-input multiple-output technique, comprising:
   a receiver for receiving a transmitted signal and obtaining an interfering data stream;
   a credit assessment block for calculating a value of a credit;
   a judgment block for deciding whether the credit is above a predefined threshold;
   a regeneration block for regenerating an interference signal by using the interfering data stream;
   a subtractor for subtracting the regenerated interference signal from the received transmitted signal to obtain a target signal; and
   a demodulating and decoding block for demodulating and decoding the target signal;
   wherein the credit assessment block is configured to calculate the value of the credit by using soft bits of the interfering data stream; and
   wherein the credit assessment block comprises:
   an extractor for extracting amplitudes of the soft bits, $x_i$;
   a first calculator for calculating an average of the soft bits $x_i$, $A_1$;
   a second calculator for calculating an average of square of the soft bits $x_i$, $A_2$;
   a third calculator for calculating an average of power of three of the soft bits $x_i$, $A_3$;
   a forth calculator for calculating a decision variable $$Z = \frac{A_3 - A_1 \cdot A_2}{A_3 - A_1 \cdot A_2 + A_1^3};$$

a fifth calculator for calculating ρ value as the credit by using the calculated decision variable Z and an equation:

$$Z(\rho) = \frac{2\rho + \sqrt{\frac{2}{\pi}} e^{-\frac{\rho^2}{2}} \left(2e^{-\sqrt{\frac{\pi}{2}} \cdot \rho} - 1\right)}{2\rho + \sqrt{\frac{2}{\pi}} e^{-\frac{\rho^2}{2}} \left(2e^{-\sqrt{\frac{\pi}{2}} \cdot \rho} - 1\right) + \left[\rho + \sqrt{\frac{2}{\pi}} e^{-\sqrt{\frac{\pi}{2}} \cdot \rho} e^{-\frac{\rho^2}{2}}\right]^3}.$$

2. The apparatus of claim 1, wherein the soft bits is obtained after demodulation of the interfering data stream or Hybrid Automatic Repeat reQuest combining of the interfering data stream.

3. The apparatus of claim 1, wherein the credit assessment block comprises:
   a calculator for calculating a signal-to-noise-ratio of the soft bits as the credit.

4. The apparatus of claim 1, wherein the predefined threshold is between −10 dB~20 dB.

5. The apparatus of claim 1, wherein the regeneration block is configured to regenerate the interference signal by using the soft bits before the interfering data stream is decoded.

6. The apparatus of claim 5, wherein the regeneration block further comprises:
   a modulator for modulating the soft bits.

7. The apparatus of claim 1, wherein the regeneration block is configured to regenerate the interference signal after the interfering data stream is decoded.

8. The apparatus of claim 7, wherein the regeneration block is further configured to regenerate the interference signal by using Log Likelihood Ratio values.

9. A method for cancelling in-band interference in a cellular telecommunication system which using multiple-input multiple-output technique, comprising:
   receiving a transmitted signal and obtaining an interfering data stream;
   calculating a value of a credit;
   deciding whether the credit is above a predefined threshold;
   regenerating an interference signal by using the interfering data stream if the credit is above the predefined threshold;
   subtracting the regenerated interference signal from the received transmitted signal to obtain a target signal; and
   demodulating and decoding the target signal;
   wherein the step of calculating a value of a credit comprises:
   calculating the value of the credit by using soft bits of the interfering data stream;
   extracting amplitudes of the soft bits, $x_i$;
   calculating an average of the soft bits $x_i$, $A_1$;

calculating an average of square of the soft bits $X_i$, $A_2$;
calculating an average of power of three of the soft bits $x_i$, $A_3$;
calculating a decision variable $$Z = \frac{A_3 - A_1 \cdot A_2}{A_3 - A_1 \cdot A_2 + A_1^3};$$

calculating p value as the credit by using the calculated decision variable Z and an equation:

$$Z(\rho) = \frac{2\rho + \sqrt{\frac{2}{\pi}} e^{-\frac{\rho^2}{2}}\left(2e^{-\sqrt{\frac{\pi}{2}} \cdot \rho} - 1\right)}{2\rho + \sqrt{\frac{2}{\pi}} e^{-\frac{\rho^2}{2}}\left(2e^{-\sqrt{\frac{\pi}{2}} \cdot \rho} - 1\right) + \left[\rho + \sqrt{\frac{2}{\pi}} e^{-\sqrt{\frac{\pi}{2}} \cdot \rho} e^{-\frac{\rho^2}{2}}\right]^3}.$$

10. The method of claim 9, wherein the soft bits is obtained after demodulation of the interfering data stream or Hybrid Automatic Repeat reQuest combining of the interfering data stream.

11. The method of claim 9, wherein the step of calculating a value of a credit further comprises:

calculating a signal-to-noise-ratio of the soft bits as the credit.

12. The method of claim 9, wherein the predefined threshold is between −10 dB~20 dB.

13. The method of claim 9, wherein the step of regenerating an interference signal by using the interfering data stream comprises:

regenerating the interference signal by using the soft bits before the interfering data stream is decoded.

14. The method of claim 13, wherein the step of regenerating an interference signal by using the interfering data stream further comprises:

modulating the soft bits.

15. The method of claim 9, wherein the step of regenerating an interference signal by using the interfering data stream comprises:

regenerating the interference signal after the interfering data stream is decoded.

16. The method of claim 15, wherein the step of regenerating an interference signal by using the interfering data stream further comprises:

regenerating the interference signal by using Log Likelihood Ratio values.

* * * * *